A. W. WALL.
MOTOR VEHICLE.
APPLICATION FILED AUG. 7, 1909.

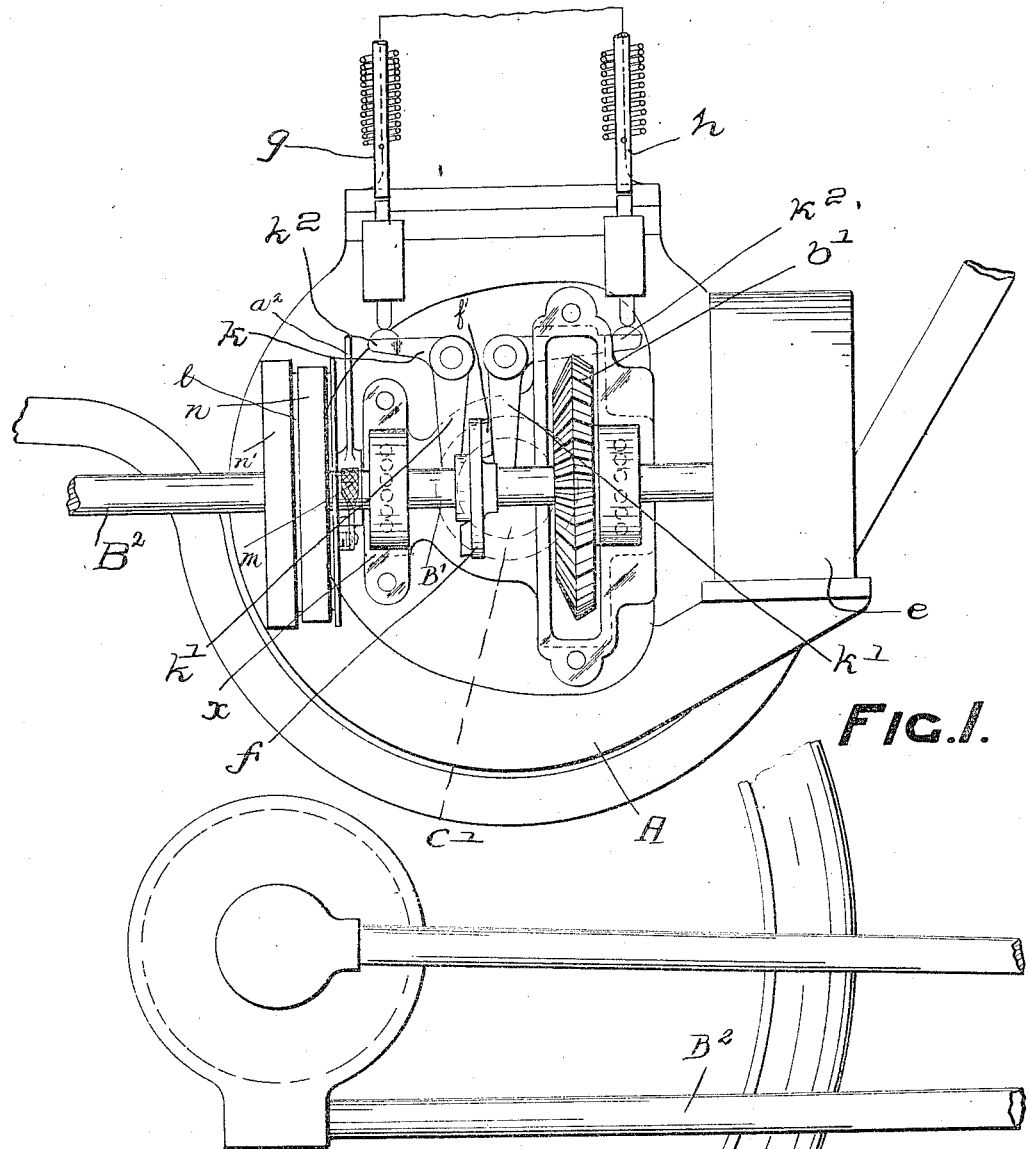

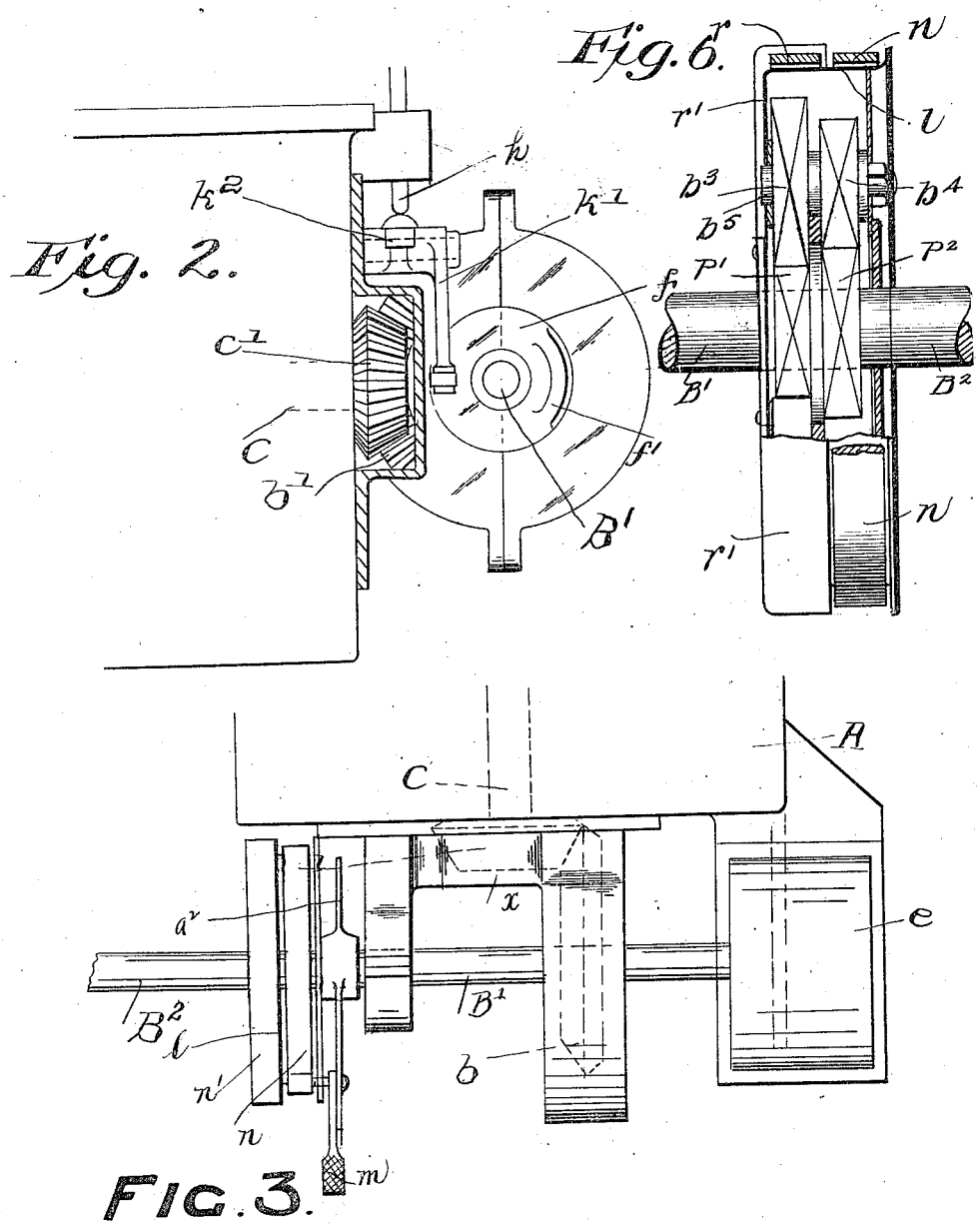

1,036,041.

Patented Aug. 20, 1912.
3 SHEETS—SHEET 3.

Witnesses
Inventor
Arthur W. Wall
Atty

UNITED STATES PATENT OFFICE.

ARTHUR W. WALL, OF BIRMINGHAM, ENGLAND.

MOTOR-VEHICLE.

1,036,041. Specification of Letters Patent. Patented Aug. 20, 1912.

Application filed August 7, 1909. Serial No. 511,736.

*To all whom it may concern:*

Be it known that I, ARTHUR WILLIAM WALL, a subject of the Kingdom of Great Britain, and resident of Roc-Motor Works, Aston Road, Birmingham, in the county of Warwick, England, have invented certain new and useful Improvements in or Relating to Motor-Vehicles, of which the following is a specification.

The present invention relates to starting mechanism for internal combustion engines, and especially to engines of that type used on motor cycles, and has for its purpose to provide an arrangement whereby the initial stroke of the piston may be imparted through a pedal that is actuated by the rider.

The invention has for its further purpose to associate the starting mechanism with the gear casing of the transmission gearing.

With these and other objects in view the invention consists in the novel details of construction and combinations of parts more fully hereinafter disclosed and particularly pointed out in the claims.

Figure 4:
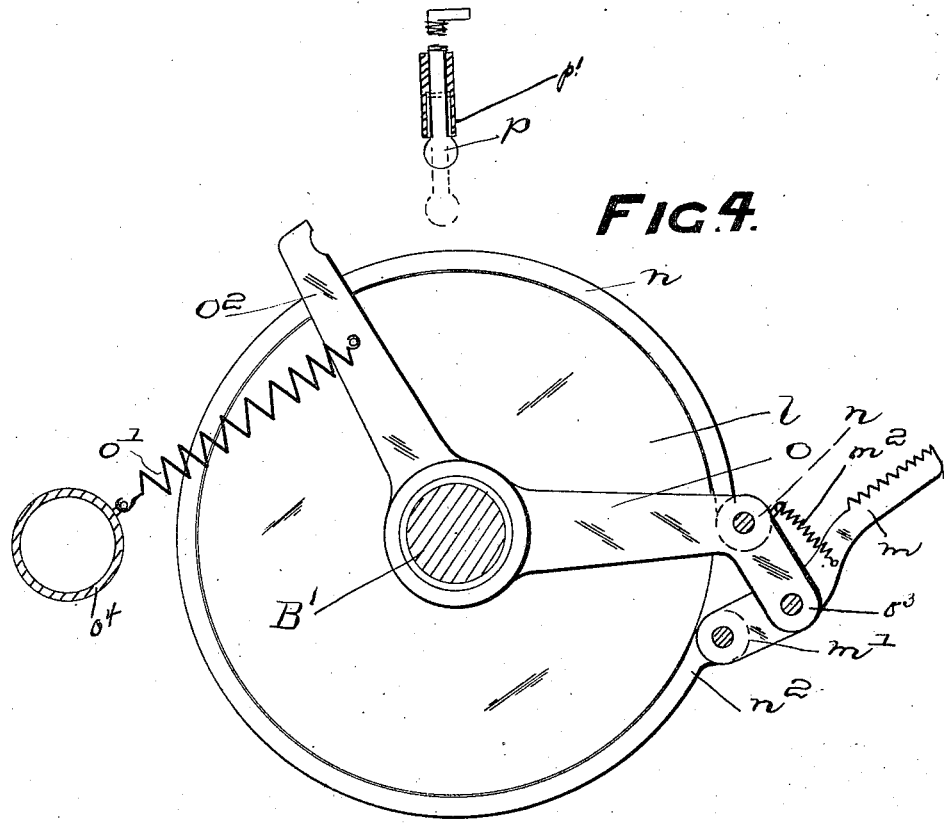
Figure 5:
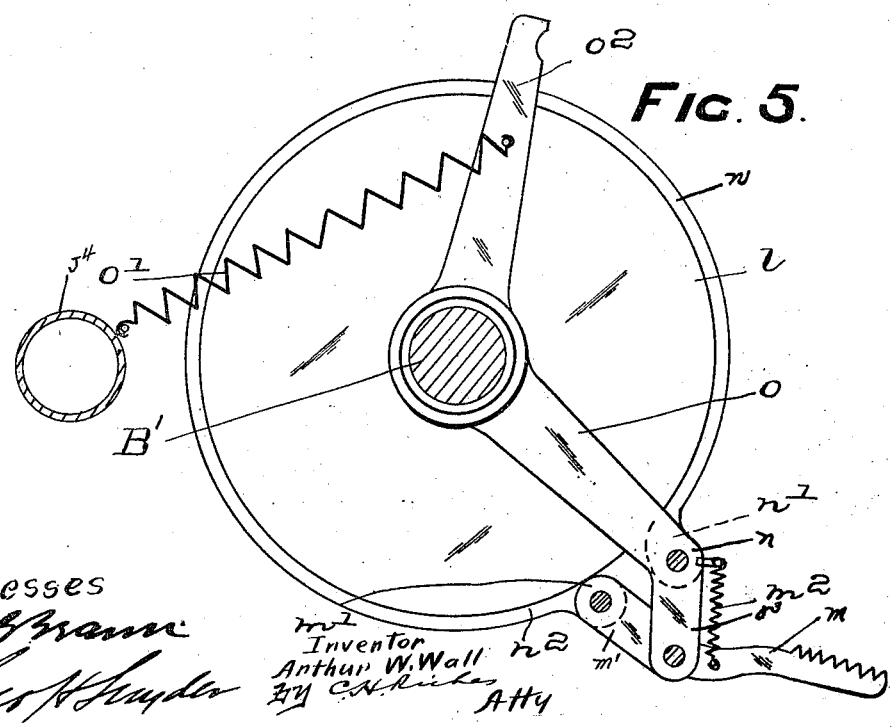

Referring to the accompanying drawings forming a part of this specification in which like characters designate like parts in all the views:—Figure 1 shows in two parts a side elevational view disclosing the application of the invention to the frame of a motor cycle; Fig. 2 is an end elevation, partly in section, of parts shown in Fig. 1; Fig. 3 is a top plan view of Fig. 1 with parts omitted for clearness; Fig. 4 is a side elevation, partly in section, of the starting mechanism and associated parts; Fig. 5 is a view similar to Fig. 4 showing the parts in a different position, and Fig. 6 is a vertical sectional view of the transmission gearing and floating gear casing.

Referring to the construction in further detail A designates the engine and B' and B² the shaft thereof which is connected to be driven from the engine through the medium of beveled gears $b'$ and $c'$ mounted respectively on the transmission shaft B' and the engine driving shaft C. The shaft B' is suitably journaled in a bracket $x$ secured to the casing of the engine A and provided with the usual bearings (see Fig. 1). Said driving shaft is connected with the driven shaft B² through the transmission gearing shown in Fig. 6.

The elements above referred to are suitably mounted on the frame F of a motor vehicle. The upper portion of Fig. 1 shows that part of the vehicle frame which is located near the usual pedals, and the lower part of the figure shows the usual connection of the vehicle frame with the rear or driving wheel.

A disk $f$ is mounted on the shaft B' and is provided with a pair of cams $f'$ disposed on opposite faces thereof, and adapted to actuate valve controlling rods $g$, $h$, through the medium of bell crank levers $k$. Each of said levers has one arm $k'$ thereof adapted to be engaged by its respective cam $f'$, and an arm $k^2$ adapted to engage with its respective valve controlling rod. At its forward end the shaft B' carries the armature of a magneto $e$ of the ignition system, as will be understood.

The floating gear casing $l$ is mounted on the transmission shaft (B' and B²) at any place within convenient reach of the foot of the driver, a preferred location therefor being that position indicated in Fig. 1. Immediately adjacent the gear casing $l$ is a two arm lever ($o$ and $o^2$) journaled on the shaft B'. The arm $o$ of said lever has connected thereto one end of a contractile strap or band $n$, which band encircles and closely overlies the periphery of said gear casing. The other end $n^2$ of said contractile band is connected with the extension of a pedal or treadle $m$. Said pedal $m$ is pivotally mounted to an extension $o^3$ of the lever arm $o$. A retracting spring $m^2$ is connected at its opposite ends to the arm $o$ and pedal $m$, and tends to hold said pedal raised and in which position the tension on the contractile band $n$ is released; it being understood, of course, that such tension is applied when the treadle $m$ is engaged by the foot of the driver. The arm $o^2$ is connected to a fixed part $o^4$ by a retracting spring $o'$, which spring tends to hold the lever ($o$, $o^2$) in inoperative position, as illustrated in Fig. 4.

From the foregoing it will be readily seen that by engaging the pedal $m$ and depressing the same, causes the contractile band $n$ to have tight frictional engagement with the gear casing $l$ and on the continued turning movement of the lever ($o$, $o^2$) said lever assumes substantially that position indicated in Fig. 5. From this position the lever will be returned to the position shown in Fig. 4 by the action of the spring $o'$. The operation just described may, of course, be repeated if necessary.

A stop $p$ is movably mounted on any convenient part $p'$ of the machine frame and is adapted to be moved into or out of the path of the lever arm $o^2$. When moved into the path of said lever the lever is arrested and the contractile band $n$ is further tensioned against the gear casing $l$, thereby holding the latter for the purpose of bringing the transmission gear into operation to rotate the shaft $B'$ and $B^2$ at different speeds.

The adjacent ends of the driving and driven shafts $B'$ and $B^2$ are provided respectively with pinions $P'$ and $P^2$ keyed thereon, which are of different diameters and in mesh with the planet pinions $b^3$ and $b^4$ respectively. The pinions $b^3$ and $b^4$ are mounted to rotate on the spindle $b^5$ carried by the gear casing $l$. The gear casing $l$ may be held stationary by means of the brake band $n$, or rotated from the driven shaft $B'$ through the intermediary of the high speed clutch band $r$ that is connected with the member $r'$, which is in turn secured to the sun pinion $P'$.

It is obvious that those skilled in the art may vary the details of construction and arrangement of parts without departing from the spirit of my invention, and therefore I do not wish to be limited to such features except as may be required by the claims.

What I claim is:—

1. In an internal combustion engine, the combination of a driving and a driven shaft; a transmission gearing connecting said shafts; a floating gear casing; and means for engaging with said gear casing for rotating the same to impart initial movement to the driving shaft to start the engine, substantially as described.

2. In an internal combustion engine, the combination of a driving and a driven shaft; a transmission gearing connecting said shafts; a floating gear casing; a contractile band encircling said gear casing; a fulcrumed lever connected with said band; and a device connected with said lever and band to contract the band to engage with and rotate the gear casing for imparting initial movement to the engine, substantially as described.

3. In an internal combustion engine, the combination of a driving and a driven shaft; a transmission gearing connecting said shafts; a floating gear casing; a contractile brake band encircling said gear casing adapted to hold the same for effecting variable speed between said shafts; and means for rotating said band while contracted to engage with and turn the gear casing for imparting initial movement to the engine, substantially as described.

4. In an internal combustion engine, the combination of a driving and a driven shaft; a transmission gearing connecting said shafts; a floating gear casing; a lever fulcrumed on the driving shaft; a pedal mounted on said lever; a contractile band encircling said gear casing and having its ends connected with said pedal and lever, said pedal adapted to contract the band to engage with and rotate the gear casing for imparting initial movement to the engine; and a stop for engaging with and holding said lever whereby said band acts to brake the gear casing for effecting variable speed between said shafts, substantially as described.

5. The combination with an internal combustion engine having a driving shaft and a driven shaft; a transmission gear connecting said shafts; and a floating gear casing; of a two-armed lever fulcrumed on the driving shaft; a pedal mounted on one arm of said lever; a contractile band encircling said gear casing and having its ends connected with said lever arm and said pedal, said pedal adapted to contract the band to engage with and rotate the gear casing for imparting initial movement to the engine; and a device for arresting the other arm of said lever whereby to contract the band to hold the gear casing for effecting variable speed between said shafts; and a retraction spring connected with said lever for restoring the same to normal position, substantially as described.

6. The combination with an internal combustion engine having a driving and a driven shaft; a transmission gear connecting said shafts; and a floating gear casing for said transmission gearing; of a two-armed lever fulcrumed on the driving shaft; a pedal pivotally mounted on one arm of said lever; a contractile band encircling said gear casing and having its ends connected with said lever arm and pedal; said pedal adapted to contract the band to engage with and rotate the gear casing for imparting initial movement to the engine; a retraction spring for said pedal; a movable stop adapted to engage with the other arm of said lever for holding said lever to contract the band and brake the gear casing for effecting a variable speed between said shafts; and a retraction spring connected with said last named lever arm for restoring said lever to normal position, substantially as described.

In witness whereof I have hereunto set my hand in the presence of two witnesses.

ARTHUR W. WALL.

Witnesses:
ROWLAND L. GOOLD,
WALTER H. E. BARTLAM.